United States Patent
Heyraud et al.

(10) Patent No.: US 7,707,202 B2
(45) Date of Patent: Apr. 27, 2010

(54) METHOD AND SYSTEM FOR IMPROVING A RESERVATION OR A PURCHASE PROCESS OF AN ENTITY

(75) Inventors: Jean-Noël Heyraud, Valbonne (FR); Wilfrid Johnston, Paris (FR); Tran-Dzien Nguyen, Le Cannet (FR)

(73) Assignee: Amadeus SAS, Sophia Antipolis Cedex (FR)

( * ) Notice: Subject to any disclaimer, the term of this patent is extended or adjusted under 35 U.S.C. 154(b) by 334 days.

(21) Appl. No.: 11/820,527

(22) Filed: Jun. 20, 2007

(65) Prior Publication Data

US 2008/0319945 A1    Dec. 25, 2008

(51) Int. Cl.
G06F 7/00    (2006.01)
G06F 17/30    (2006.01)

(52) U.S. Cl. ...................... 707/706; 707/754

(58) Field of Classification Search ............... 707/1–10, 707/100–104.1, 200–206; 705/5, 6; 715/763
See application file for complete search history.

(56) References Cited

U.S. PATENT DOCUMENTS

| | | | |
|---|---|---|---|
| 6,295,521 B1 | 9/2001 | DeMarcken et al. | |
| 6,307,572 B1 * | 10/2001 | DeMarcken et al. | 715/763 |
| 6,801,226 B1 | 10/2004 | Daughtrey | |
| 2004/0236616 A1 | 11/2004 | Daughtrey | |
| 2005/0036616 A1 | 2/2005 | Huang et al. | |

FOREIGN PATENT DOCUMENTS

WO    WO 0133473 A2    5/2001
WO    WO 0217203 A1    2/2002

OTHER PUBLICATIONS

Wiederhold., Mediators in the architecture of future information systems, Mar. 1992, IEEE, vol. 25, 38-49.*
Chu et al., A structured approach for cooperative query answering, Oct. 1994, IEEE, vol. 6, 738-749.*
Ricci, Francesco, et al., "Intelligent Query Management in a Mediator Architecture", 2002 First International IEEE Symposium "Intelligent Systems", Sep. 2002 pp. 221-226.

* cited by examiner

*Primary Examiner*—Jean B Fleurantin
(74) *Attorney, Agent, or Firm*—Drinker Biddle & Reath LLP (57) ABSTRACT

Method of searching for availability of an entity for purchase or reservation. The method comprises the steps of searching for an entity matching a search criteria to obtain a list of entities, wherein the or each entity comprises a parameter having a predetermined availability; automatically searching for one or more available parameters associated with the or each entity; generating a list of each entity and one or more available parameters associated therewith to generate a list of entity and available parameters; displaying the list of entity and available parameters of the or each entity for selection by a user of an appropriate combination of entity and parameter; filtering the list of entity and available parameters in order to remove one or more combination of entity and parameter; and displaying a modified list of entity and available parameter.

12 Claims, 10 Drawing Sheets

| | | | | | |
|---|---|---|---|---|---|
| 1. Search | 2. Hotels | 3. Traveler | 4. Reservation | | Last Searches (8) |
| | | | | | Saved Hotels (0) |

Search View search form

Filter your results
Active filters:

| Listing view | Detailed view | Map view |
|---|---|---| sort by: [None selected ▼]    Distance in: [km ▼]

Results: 64 Hotels

| | Hotel Name | From Price/night | B N | Distance from City center | 🍴 P 📶 🏊 ❄ ▼ |
|---|---|---|---|---|---|

| ☐ | Cosmopolitan Hotel, Tourist,Luxe Hospitality, NEW YORK | 175 USD (540 ARS) | | 0.3 km West | | ❄ | Hide rates |

| Room | From Price/night | Estimated Price | | | |
|---|---|---|---|---|---|
| Seasonal special Superior room w-1 double bed air conditioning Private bath dataport ceiling fan | 175 USD (540 ARS) | 175 USD (540 ARS) | Deposit ⓘ Conditions | | [Book] |
| Seasonal special Superior room w-2 double bed air conditioning Private bath dataport ceiling fan | 199 USD (614 ARS) | 199 USD (614 ARS) | Deposit ⓘ Conditions | | [Book] |
| Corporate rate Superior room w-1 double bed air conditioning Private bath dataport ceiling fan | 175 USD (540 ARS) | 175 USD (540 ARS) | Deposit ⓘ Conditions | | [Book] |

| ☐ | Embassy Stes New York, First Class,Embassy Suites, NEW YORK | 249 USD (769 ARS) | 0.4 km West | 🍴 | ❄ ▼ | Hide rates |

| Room | From Price/night | Estimated Price | | | |
|---|---|---|---|---|---|
| Best available rate 2 room suite-2 double beds- nonsmoking | 439 USD (1356 ARS) | 439 USD (1356 ARS) | Guarantee ⓘ Conditions | | [Book] |
| Best available rate 2 room suite-1 king bed-nonsmoking | 439 USD (1356 ARS) | 439 USD (1356 ARS) | Guarantee ⓘ Conditions | | [Book] |
| Best available rate 2 room suite-1 king bed-smoking | 439 USD (1356 ARS) | 439 USD (1356 ARS) | Guarantee ⓘ Conditions | | [Book] |

[More Rates]

| ☐ | Hilton Millenium, First Class,Hilton Hotels Corporation, NEW YORK | 189 USD (584 ARS) | 0.5 km West | 🍴 | 📶 | ❄ ▼ | Hide rates |

| Room | From Price/night | Estimated Price | | | |
|---|---|---|---|---|---|
| 1 king bed junior suite floors 8 - 30 Sitting area-sofabed- 42 in plasma tv | 439 USD (1356 ARS) | 439 USD (1356 ARS) | Guarantee ⓘ Conditions | | [Book] |
| 1 king bed junior suite cityview fl 31 - 54 Sitting area-sofabed- 42 in plasma tv | 469 USD (1449 ARS) | 469 USD (1449 ARS) | Guarantee ⓘ Conditions | | [Book] |

[More Rates]

| ☐ | Tribeca Grand Hotel, Luxury,Tribeca and Soho, NEW YORK | 374 USD (1155 ARS) | | 0.6 km North | 🍴 | | ❄ ▼ | Show rates |
| ☐ | Hampton Inn Manhattan Seaport, Standard,Hampton Inns, NEW YORK | 179 USD (553 ARS) | | 0.7 km South | | | ❄ | Show rates |
| ☐ | Holiday Inn Downtown, Standard,Holiday Inn, NEW YORK | 206 USD (636 ARS) | | 0.7 km East | 🍴 | | ❄ | Show rates |
| ☐ | Hi Wall Street District, Standard,Holiday Inn, NEW YORK | 359 USD (1109 ARS) | | 0.7 km South | 🍴 | | ❄ | Show rates |
| ☐ | Best Western Seaport Inn Downtown, Standard,Best Western, NEW YORK | 209 USD (645 ARS) | B | 0.8 km South | | | ❄ | Show rates |

Filter panel (right):
- Distance
- Hotel Category
- Hotel Chain
- City
- Location Searching:
▓▓▓▓▓▓▓▓
0 Hotels
[More Hotels]

METHOD AND SYSTEM FOR IMPROVING A RESERVATION OR A PURCHASE PROCESS OF AN ENTITY

FIELD

This disclosure relates to a method and system for improving searching for availability of an end user entity for purchase, reservation or the like, such as online checking and booking of travel products and services in the travel industry (for example, searching for room availability in a hotel or searching for availability of an apartment, a vehicle or a seat).

BACKGROUND

There are many kinds of booking system in the travel industry or in the entertainment industry, which allow a user to find a specific seat or room by means of a searching system. For instance, in the travel industry, if the user wants to book a room in a hotel through a website, the process is as follows. At first, the user has to enter one or more criteria in the required location on a website in order to launch a first request to a server to obtain a list of hotels matching the criteria. Thus the booking system displays an exhaustive list of all the matching hotels that match the criteria. If the user wants to add new criteria or to modify criteria in the request, the user has to build a successive request or requests to be sent to the server. However, processing successive requests brings many drawbacks such as degraded server performance and long response time for users.

SUMMARY

An object of the method and system for improving searching for availability of an end user entity is to overcome at least some of the problems associated with the prior art.

According to one aspect, there is provided a method of searching for availability of an entity for purchase or reservation, wherein said method comprises the steps of searching for an entity matching a search criterion to obtain a list of entities, wherein the or each entity comprises a parameter having a predetermined availability; automatically searching for one or more available parameters associated with the or each entity at substantially the same time; incrementally generating a list of each entity and one or more available parameters associated therewith to generate a list of entity and available parameters as the automatic search provides one or more results; displaying the list as it is generated for selection by a user of a predetermined combination of entity and parameter.

According to another aspect, there is provided a system for searching for availability wherein the system comprises a search module for searching for an entity matching a search criterion to obtain a list of entities, wherein the or each entity comprises a parameter having a predetermined availability and automatically searching for one or more available parameters associated with the or each entity, a memory module for incrementally generating a list of each entity and one or more available parameters associated therewith to generate a list of entity and available parameters at substantially the same time, a filter for filtering the list of entity and available parameters in order to remove one or more combination of entity and parameter thereby generating modified list, a display for displaying the list or the modified list as it is generated by the memory module or filter for selection by a user of a predetermined combination of entity and parameter.

BRIEF DESCRIPTION OF THE DRAWINGS

Reference will now be made, by way of example, to the accompanying drawings, in which:

FIG. 4 is a screen print of the displayed results in accordance with the disclosed embodiment, given by way of example.

DETAILED DESCRIPTION OF THE DISCLOSED EMBODIMENTS

The method and system disclosed and described is directed to a user who may want to book, reserve or purchase a seat in a train, in an airplane, in a theatre, a room in a hotel or car for rent for example. The method and system will be described with reference to the example of an availability search for an entity such as a room in a hotel. This availability search can be a positive availability search or a negative availability search. A positive availability means the presence of an item. A negative availability means the absence of an item. The method will be described with reference to a positive availability.

Figure 1:
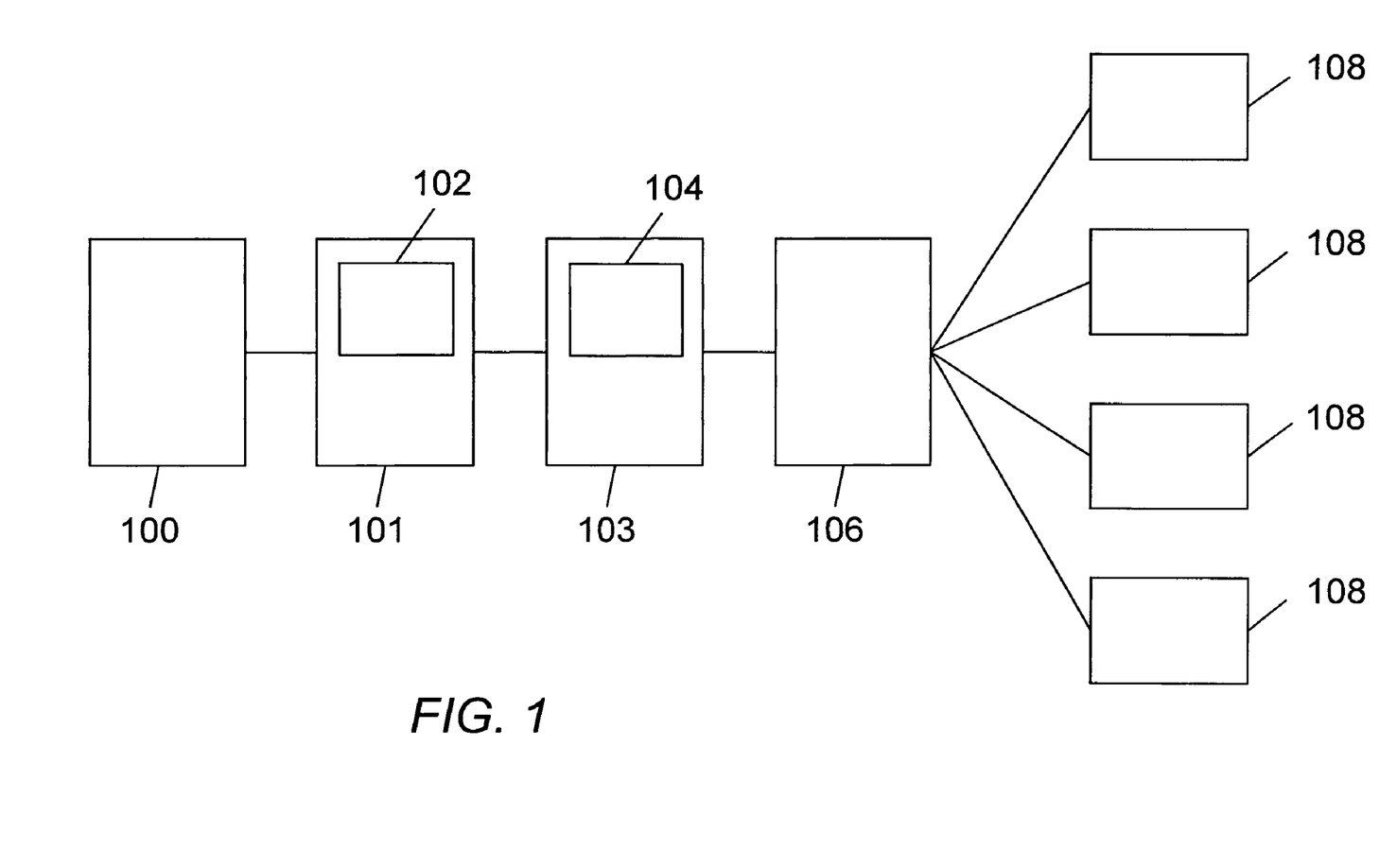
FIG. 1 is a schematic diagram of the different modules to carry out the method in accordance with one embodiment of the method and system disclosed herein, given by way of example.

As shown in FIG. 1, a computer 100 is connected to a web site of a web server or to a client machine 101 of a sales or reservation interface 102. The web server can be a server of a travel agency or any other appropriate server. In order to launch an availability search to find an available room in a hotel, a user selects and enters criteria on the website in order to effect the search. This will be described in greater detail below.

The sales or reservation interface comprises an application which deals with requests from the user. The sales or reservation interface is for example the front end of a GDS (Global Distribution System) as will be described later. The sales or reservation interface receives requests from the user and transmits them to a host machine 103 of a programming interface 104. The programming interface 104 acts as a business logic module or a business connector application. The programming interface can deal with requests or data from the sales or reservation interface application in order to carry them out. The programming interface comprises a module to carry out requests in a way to be described later. After dealing with requests, the programming interface sends requests to a server machine 106 of the GDS. The GDS carries out requests from the programming interface. The GDS can also be replaced with another kind of system if the domain is different from the travel domain. The GDS 106 has connections with databases 108. The databases are databases from airlines, theatres or hotels for instance. The databases comprise all data related to date, location, rates, etc for each kind of product or service that is being sought. The GDS 106 can send requests to the databases 108 and then return results to the programming interface 104. The programming interface can then post results of the request in a specific queue or module inside the programming interface in order to display results for the sales or reservation interface application. At the end of the process the user can see results matching the request on the computer 100.

The actions relating to searching are carried out by a combination of features of the FIG. 1 system so as to provide a searching module. Similarly the actions relation to storing and displaying the results are carried out by a combination of features of the FIG. 1 system, so as to provide a memory module.

Figure 2:
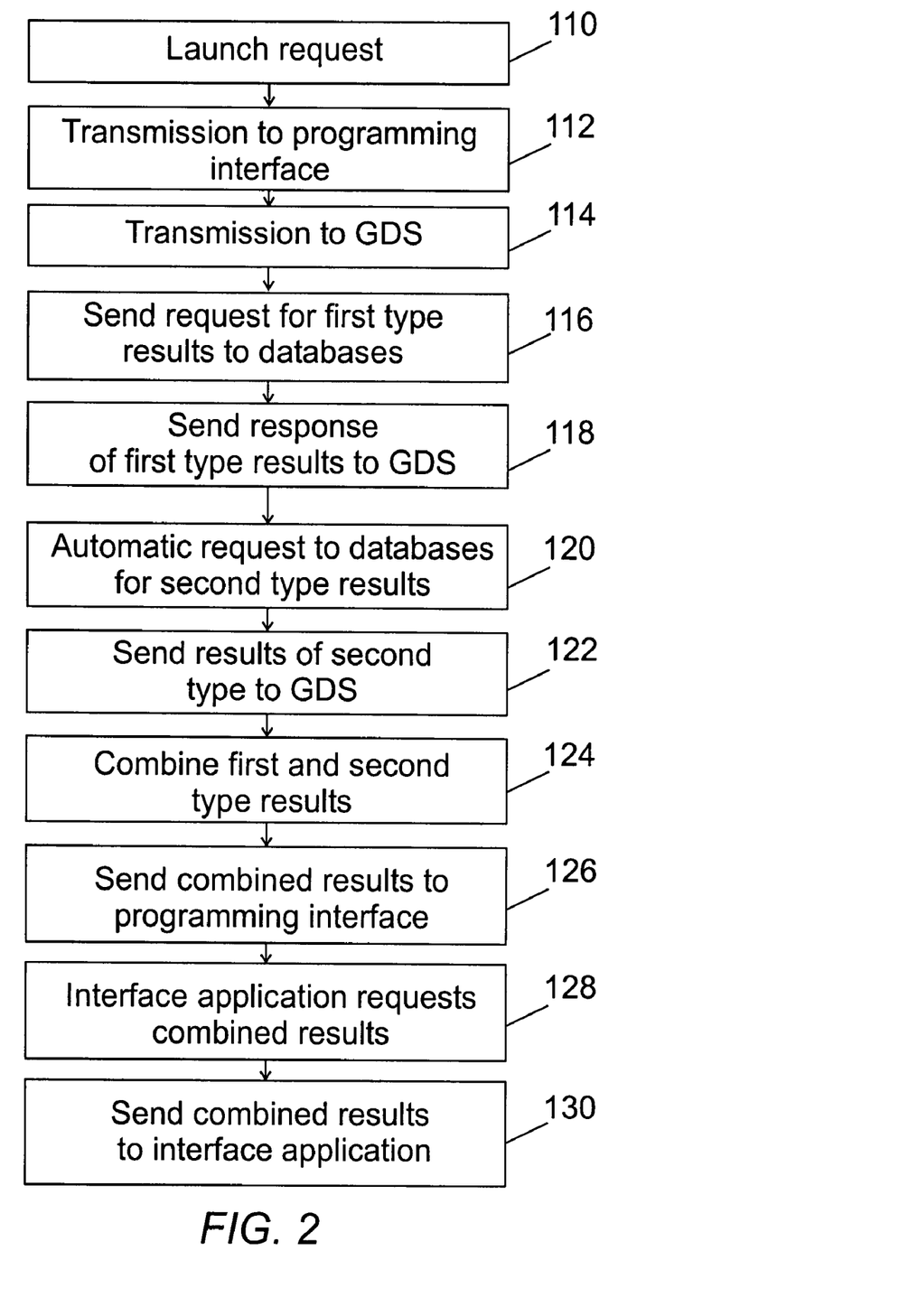
FIG. 2 is a flow chart of the method steps in accordance with the disclosed embodiment, given by way of example.

As shown in FIG. 2, the details of the steps of the method will now be described. In a first step 110, the user launches a first type of request from a web page of the sales or reservation interface. The user has to choose or enter at least one specific criterion on the web page. The criterion can be a specific city or a distance to the centre of the city for example. As an example, the user may request a search with one criterion that is related to a specific location of a hotel. After the user launches the search, the search goes to the programming interface 104 in a step 112. The programming interface 104 deals with the request in order to transmit the request to the GDS system in a step 114. In a step 116, the GDS system deals with the request by requesting data from the databases 108. For example, if the criterion of the request of the user is a specific city, the GDS system requests databases 108 to check the availabilities for any hotel located in the requested city.

After databases 108 return first results in a step 118, the GDS 106 stores a first type of results list. The results comprise a list of hotel matching the criterion of the request made by the user. In the cited example of the request of the user, the first type of results comprises a set of between 2 to 8 hotels matching the request of the user. The set of 2 to 8 hotels belongs to a total list of 50 hotels, for example matching the request. The number of results depends on the setting of the time of response of the GDS or any other appropriate parameter of the system or GDS.

After the GDS 106 receives the first set of first type results, an automatic search defined as a second type of search occurs in a step 120. In fact the GDS launches this second search to databases 108 through a search module. This second type of request needs no input from the user. With this second type of request, the GDS requests the databases 108 to search for second type of results which comprise descriptive properties of the available room for all the hotels of the first type result list. The descriptive properties or parameters can include rate codes, prices and the description of the services available at the corresponding hotels of the first results list or any other parameters.

Figure 2A:
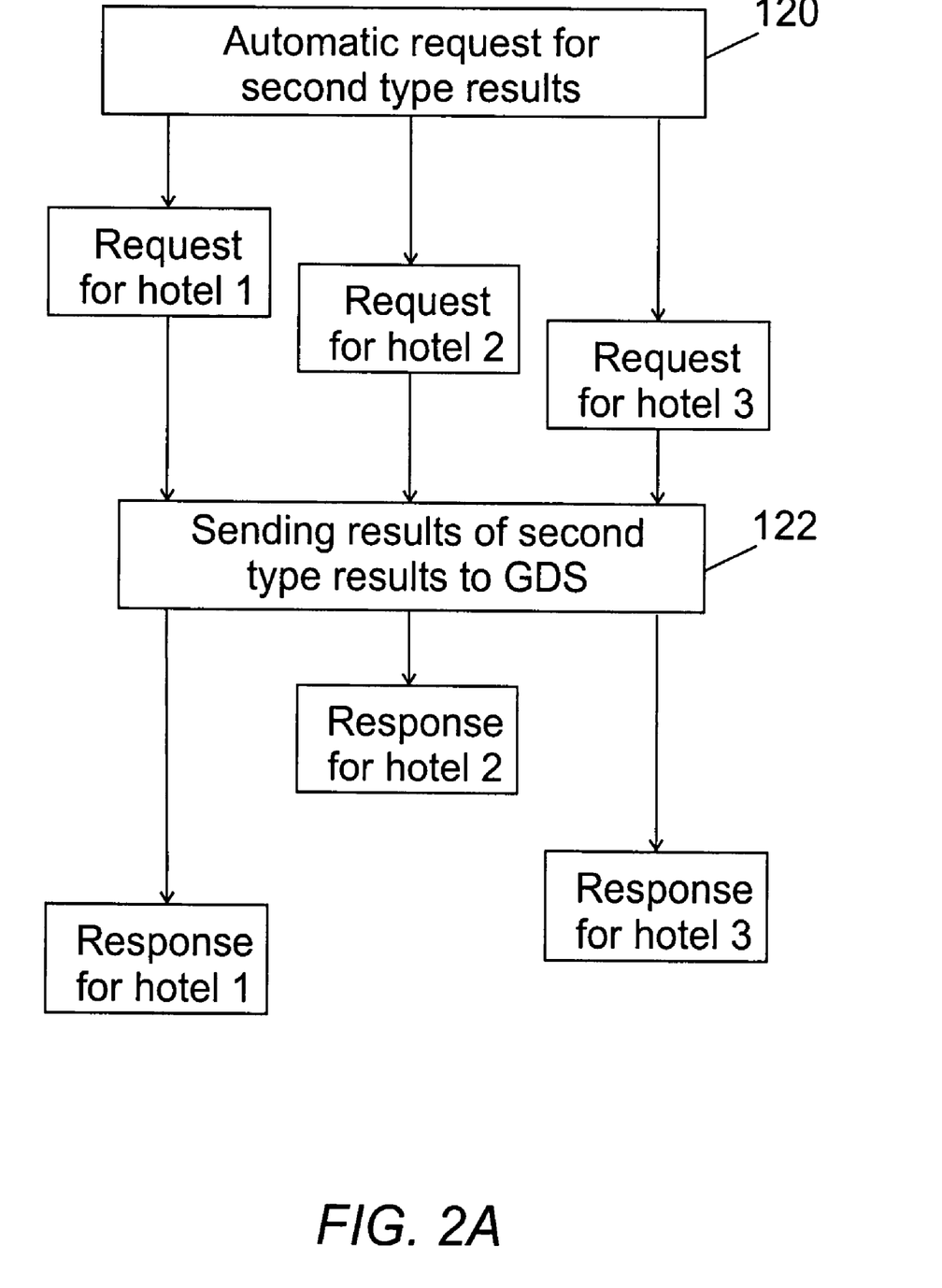
FIG. 2a is a flow chart of the method steps in accordance with the disclosed embodiment, given by way of example.
Figure 3:
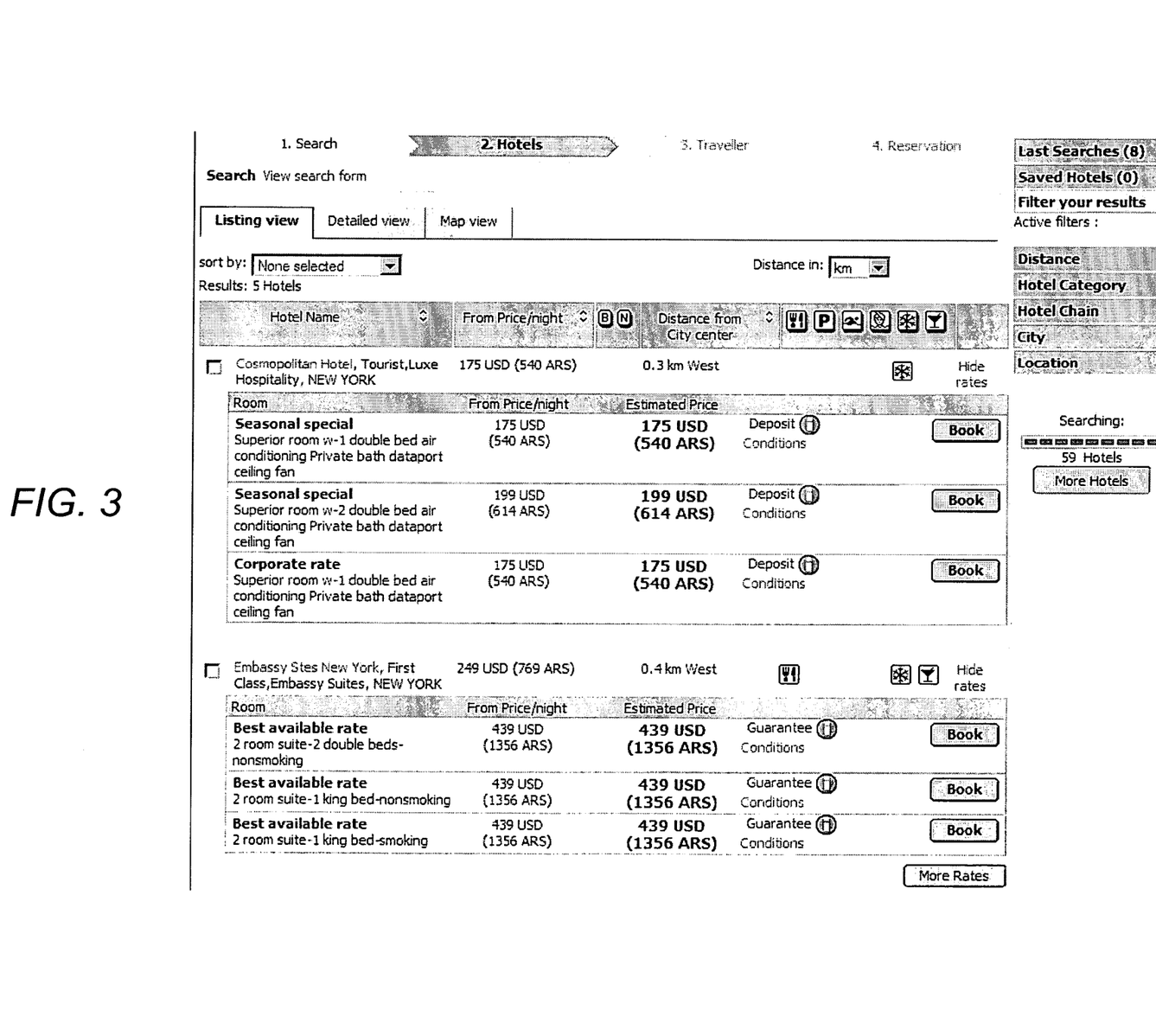
FIG. 3 is a screen print of the displayed results in accordance with the disclosed embodiment, given by way of example.
Figure 5:
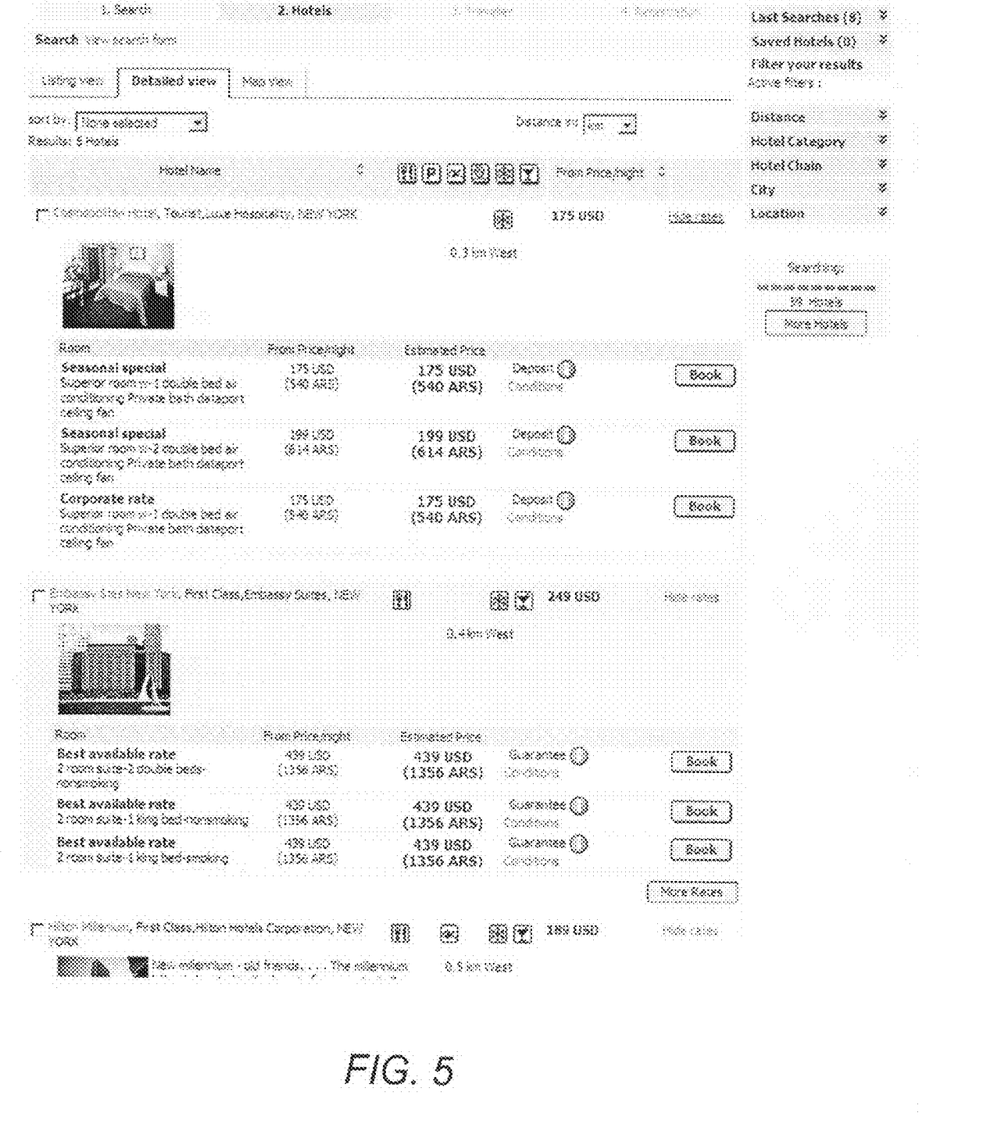
FIG. 5 is a screen print of the displayed results in accordance with the disclosed embodiment, given by way of example.
Figure 6:
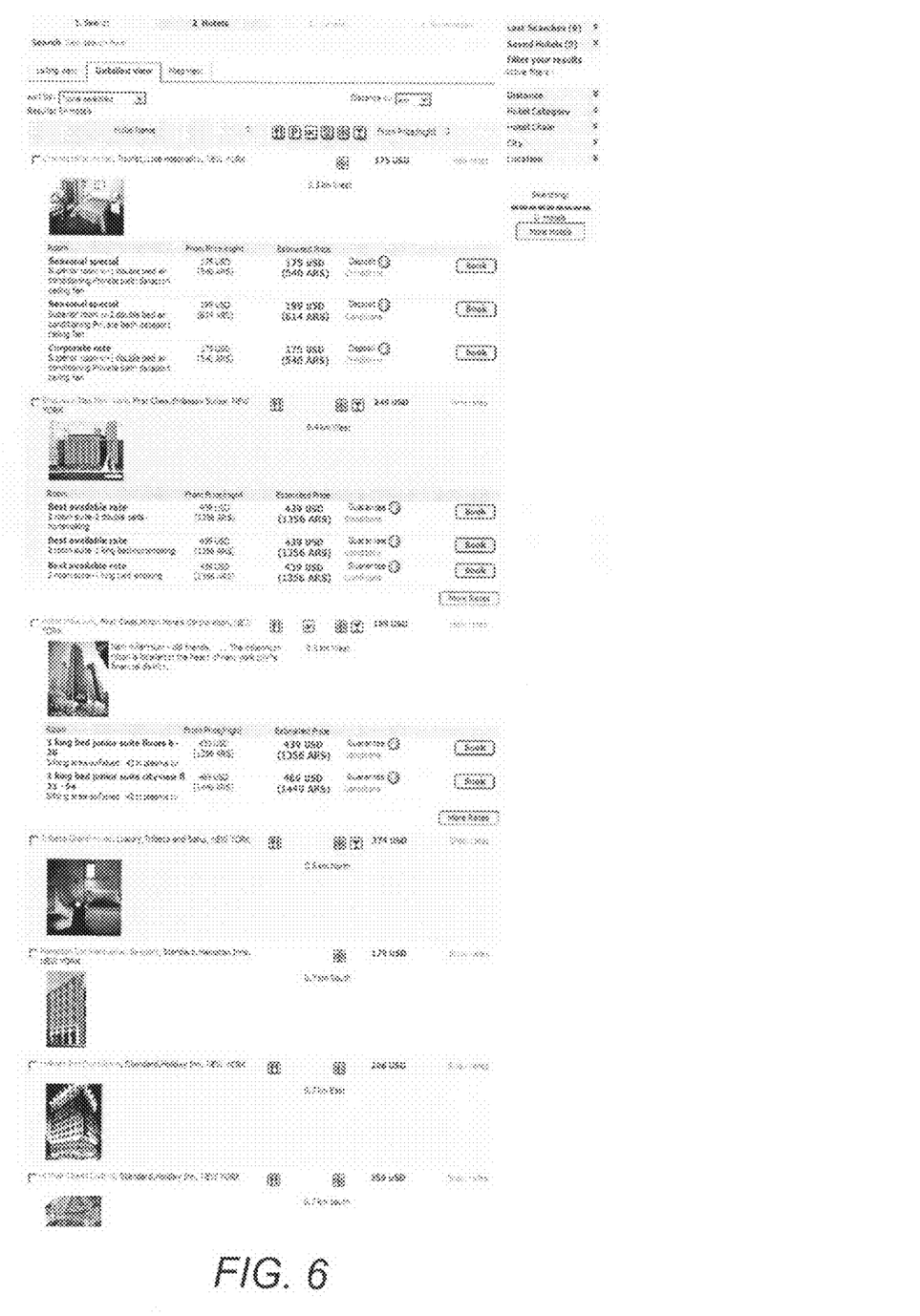
FIG. 6 is a screen print of the displayed results in accordance with the disclosed embodiment, given by way of example.
Figure 7:
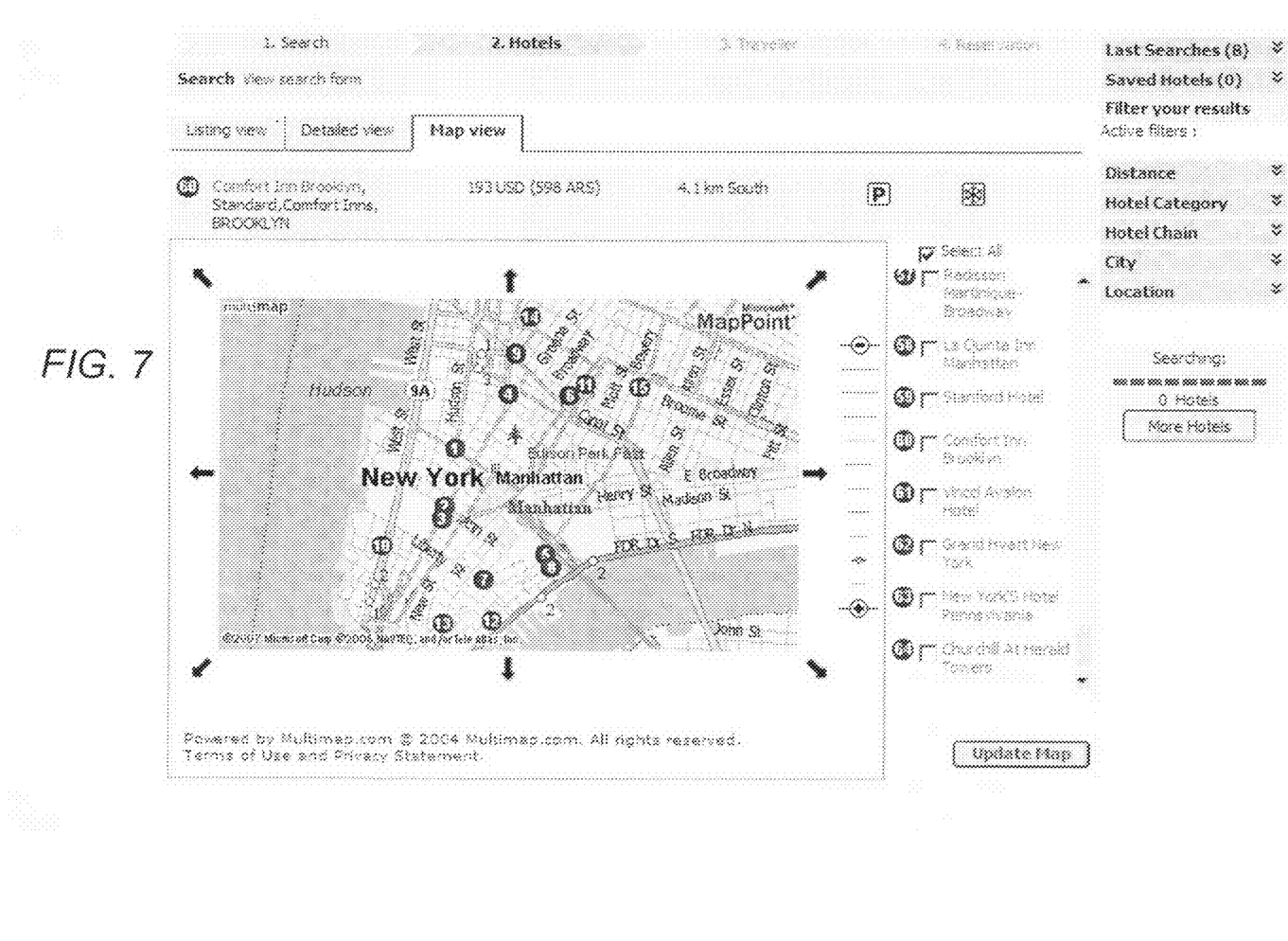
FIG. 7 is a screen print of the displayed results in accordance with the disclosed embodiment, given by way of example.

These second type of results relate to each hotel from the first results list. In the example the first list comprises 2 to 8 hotels which means that the GDS sends 2 to 8 second type of requests to databases 108 at substantially the same time. In other words, substantially the requests in accordance with the present invention occur simultaneously rather than sequentially. In a step 122 each database 108 sends a response to the GDS once the request has been attended to. Each response arrives in parallel with other responses and each response arrives within a delay, but not a uniform delay. Thus the responses may not arrive in an order which corresponds to the order of the corresponding requested hotels. For example, as shown in FIG. 2a, a request may ask for availability firstly for hotel number 1, then hotel number 2 and thirdly hotel number 3. The corresponding responses or second type of responses may arrive in another order for example firstly for hotel number 2, then for hotel number 3 and thirdly for hotel number 1. Therefore the GDS has to deal with two types of information, a first type related to hotels having a room or an entity that is available and a second type related to descriptive properties or parameters for each entity. Then in a step 124, the GDS combines both types of information in order to obtain a list of combined results. In order to obtain such a combination, a memory module allows the generation of a list of each entity or availability of a room for a specific hotel with the corresponding parameter or descriptive property.

In a step 126, the GDS sends the combined results to the programming interface. The programming interface comprises a module comprising a queue such as Java Message System (JMS) queue. This module is a modification to existing programming interfaces. The module is able to deal with several requests and results as will be described below. If the user stops the process or if a new first type of request occurs, the module removes all the results stored. The programming interface comprises the module and thus the programming interface is able to store the combined results in a waiting queue while waiting for the reservation interface to request for the results, as will be described later.

The sales and reservation interface periodically makes a request in a step 128 to the module for any waiting combined results related to the request of the user. If any combined results are waiting in the queue, the programming interface sends the combined results to the sales and reservation interface in a step 130. The time period in which this occurs is a configurable parameter of the sales and reservation interface. The sales and reservation interface can then display the combined set of results to the user on the web site.

The above described part of the method concerns the first set of 2 to 8 hotels. In fact while dealing with the second type of requests, the GDS will receive further sets of first type of response relating to hotels matching the request of the user (i.e. those outside the first set of 2 to 8 hotels). These steps occur until the GDS launches the last request of the first type for the last hotel, e.g. number 50, matching the request of the user. The GDS carries out this search through a search module. Therefore the GDS is able to send the second type of request, receive the second type of results and also receive the first type of response all in parallel. The GDS thus incrementally receives responses from the databases and the generation of a list of combined results also occurs incrementally. Therefore the waiting queue of the module also stores the combined list with new combined results in an incrementally manner. Thus the end user can visualize incrementally results matching the criterion or criteria of the request. This speeds up the process for the user and allows selection to occur more efficiently.

On the computer 100 of the user, a display shows the first result list which comprises a number of hotels from the 2 to 8 hotels as mentioned above. The result list may form part of a website or webpage or be any other format. Each line of the list displays a hotel name with the different rates or prices related to available rooms. For instance one hotel may have three available standard rate rooms and one available flexible rate room. This means that the user can see the available rooms or available entities with all the different rates or prices in a defined combination. The displayed rates do not only relate to one specific online booking rate as is known in prior art. Instead, in the present invention, the user can access any available rate in order to have all availabilities at all rates. The user can either wait for other results to be displayed or click on a specific hotel having an appropriate combination of available room or entity and parameters or descriptive properties in the combined results.

The action of the updating list stops either when the GDS has processed the whole list of first type of results or if the user stops the search in any appropriate way. The results are displayed as they arrive. The user may wait for other results in which case a new list of hotels appears either automatically or by clicking on an "add results" button. The previous and new lists may be displayed together or separately, one may replace the other. If the user clicks on a specific hotel name, the user is able to see further details such as the website of the hotel for example. Thus the user can start working on the result set (i.e. by looking at hotel properties, maps, booking a room, etc.) without waiting for the queuing mechanism to be completed. Method proposes three different modes by which the user can customize the manner in which the results are presented. The three different modes are: manual, semi-automatic and automatic and all will be described below.

The manual mode is a mode where the end-user has the full control of the incremental load of the results that are displayed:

0 to i results are loaded upon any page load;

j results are then retrieved, bit by bit; the user can click on "Add results" or "More hotels" button to transfer hotels to the main results panel (filters and sorting are applied automatically);

"Add results" or "More hotels" button is greyed out when there are no results to add;

"Add results" or "More hotels" button appears when j results have been downloaded, or 'no more results' message is received from the server;

Clicking on "Add results" or "More hotels" downloads another set of k results if available;

These results can be added to by using the "Add results" or "More hotels" button as before.

The semi-automatic mode is a mode where the incremental load is performed automatically and results are added to the current display (current sorting criterion is not applied). This is nearly identical to the automatic mode as will be described below, with the exception that any new results are added to the end of the results list and no filters or sorting are applied. There is an update filters/sorting button which can be used to apply filters and sorting to the results.

The automatic mode is a mode where the incremental load is performed automatically and results are merged with the current display (current sorting criterion is applied):

0 to i results are loaded upon any page load;

j results are then retrieved, bit by bit and put into the results panel immediately (filters and sorting are applied automatically);

If the 'no more results' message is received from the programming interface which hosts the specific module, the retrieval process stops. In that case, there is no "Add results" or "More hotels" button.

An overview of these different modes is shown on FIGS. 3, 4, 5, 6 and 7. In FIGS. 3, 4, 5 and 6, a first set of results is displayed on the web site. This search relates to a search of an available room in New York. If the user wants to see more results than those already displayed, the user can click on the "More Hotels" button on the right side of the screen. Thus further results are displayed as shown on FIG. 7 where available hotels and rooms may be displayed on a map view.

In addition to the different mode of visualization, the present invention also comprises a system of filters. Filters allow the user to remove some results from the displayed results list in order to obtain a modified list. The system of filters comprises two different types of filters. The first type of filter is a static filter. Static filters use static criteria which apply to static data. Static filters provide a predefined set of criteria for static data that do not change with the results or data being filtered. Static criteria may be a set of hotel prices for example from $0 to $100, from $100 to $200 or from $200 to $500. The corresponding static data are the data referring to such hotel prices in the results list. The set of hotel prices in the static filter does not change once a new result occurs in the list.

Figure 8:
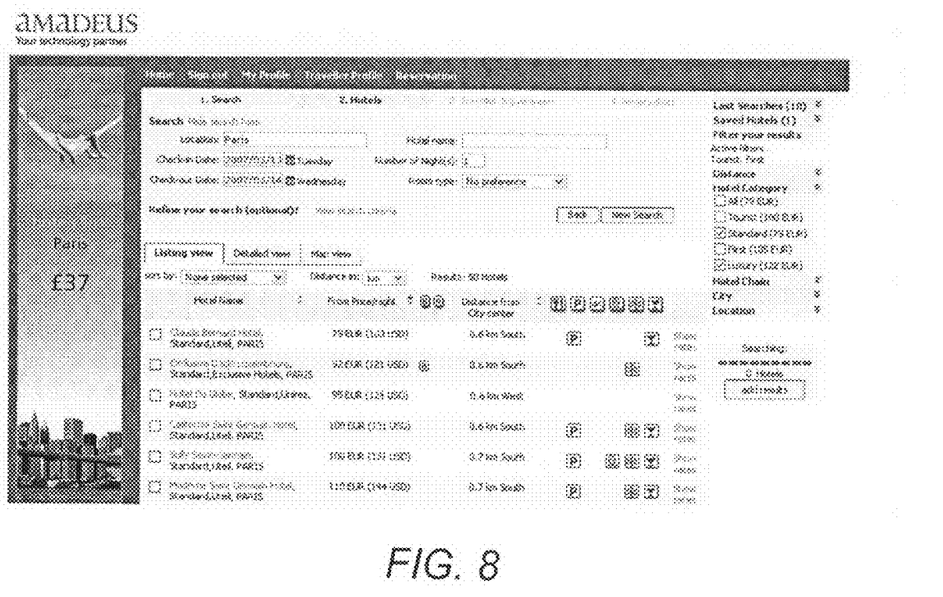
FIG. 8 is a screen print of the displayed results in accordance with the disclosed embodiment, given by way of example.
Figure 9:
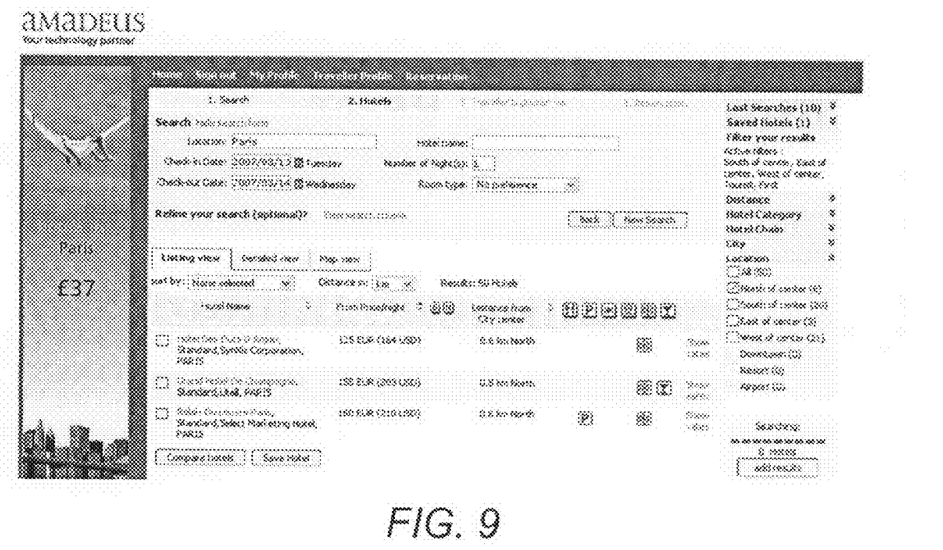
FIG. 9 is a screen print of the displayed results in accordance with the disclosed embodiment, given by way of example.
Figure 10:
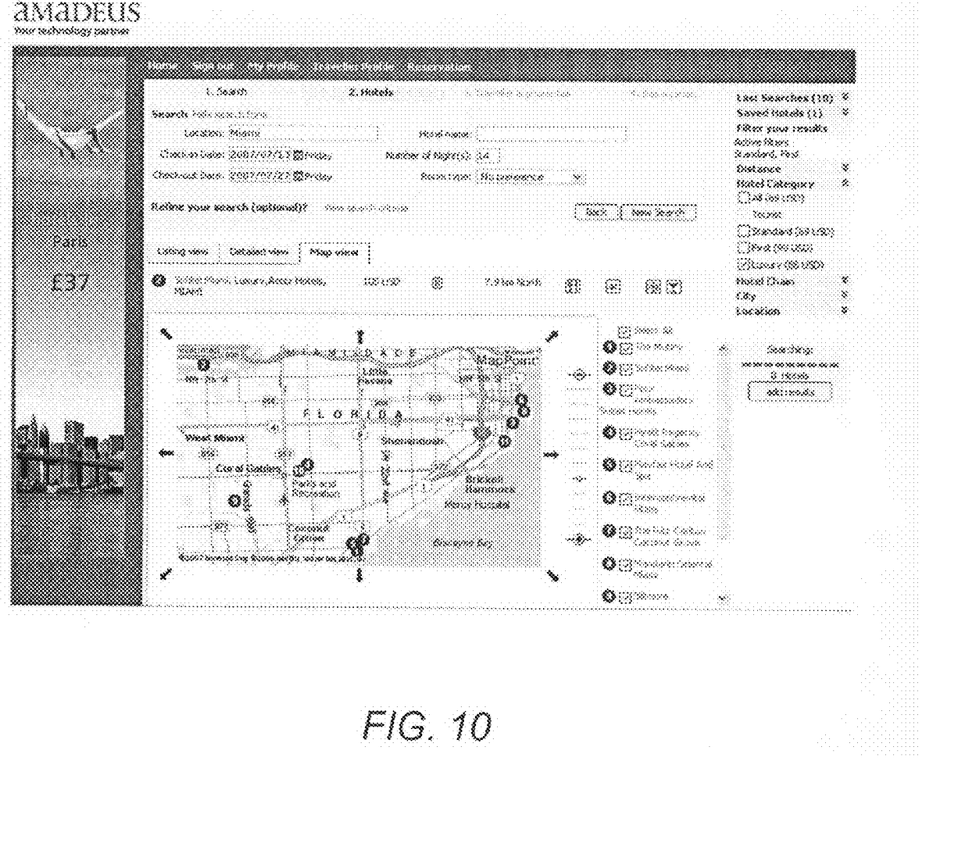
FIG. 10 is a screen print of the displayed results in accordance with the disclosed embodiment, given by way of example.

The second type of filter is a dynamic filter. Dynamic filters use dynamic criteria which apply to dynamic data. Dynamic criteria may vary at each refresh or update of the results list. Dynamic filters allow changes to the dynamic criteria depending on the data of the results list being filtered. A dynamic criterion may be, for example, a name of a hotel chain. The user can choose to filter the results list by using this criterion in order to obtain a list of data results with all the occurrences of all hotels in the hotel chain selected. In fact, depending on the results from the programming interface 104, there may be new hotel chain introduced into the list or new lowest prices for a specific rate, etc. FIGS. 8, 9 and 10 show on the right side of the screen some filters that may be present. For example, the hotel category comprises several boxes. Each check or tick in one or more boxes implies that the user wants to keep the related criterion. In order to inform the user of the corresponding removed criterion in the result list and to obtain a modified list, an active filter displays the removed criterion or criteria. The combination of the removed criteria and the criteria selected leads to a list of criteria for the filters. In another embodiment, another kind of active filter can also display the criterion or the criteria which stay in the modified list and the selected box may indicate the criterion or criteria to be removed from the results list.

The different filters can communicate with each other. If the user removes a specific criterion of a defined filter, another related criterion in another filter is automatically disabled in order to keep a consistency in the filtering request. For example if the user decides to remove all luxury hotels in the results list, the system also disables the filters for hotel chains related to the luxury hotel criterion without any input from the user.

The summary information for each filter is also configurable. In FIG. 8, the filter displays, in brackets, the minimum price of each group of results corresponding to the dynamic criterion based on hotel category. The filter can alternatively display the total number of results corresponding to the dynamic filter with this criterion or based on an average price for each hotel category.

Moreover the user can keep a specific setting of filters in a profile in order to launch the profile at the next request. This profile allows the user to directly obtain results already filtered by using the stored profile. The profile avoids re-selecting criteria from a previous request having the same filtered criterion or criteria as a present request.

The main feature of the system of filters is that it is a dynamic and smart system of filters that at each refresh or update of the results list re-runs the filtering process automatically.

It should be appreciated that there are a number of alternative embodiments to that which is presented above. The system may be applied to many different searching environments for different entities for purchase or reservation that may be controlled in a number of different ways. All the variations and changes that are possible intended to fall within the spirit and scope of the disclosed method and system.

The invention claimed is:

1. A method of searching for availability of an entity for purchase or reservation, comprising the steps of:
   searching for an entity matching a search criterion to obtain a list of entities, wherein the or each entity comprises a parameter having a predetermined availability;
   automatically searching for one or more available parameters associated with the or each entity at substantially the same time;
   incrementally generating a list of each first entity and one or more available parameters associated therewith to generate a list of entity and available parameters as the automatic search provides one or more results;
   displaying the list as said list is generated for selection by a user of a predetermined combination of entity and parameter;
   filtering the list of entity and available parameters in order to remove one or more combination of entity and parameter, wherein filtering the list of entity and available parameters comprises filtering with a dynamic filter which applies on dynamic data and a static filter which applies on static data;
   displaying a modified list of entity and available parameter; and
   displaying the one or more available parameters in a filter display to provide a display of the filtered one or more combinations of entity and parameter.

2. A method as claimed in claim 1 further comprising processing the filtering at each update of the display of the list of entity and available parameters.

3. A method as claimed in claim 1, wherein displaying the list of the or each parameter of the or each entity comprises displaying incrementally the list of the or each parameter.

4. A method as claimed in claim 1, wherein displaying the list of the or each parameter comprises displaying a list of one or more descriptive entities of the or each entity.

5. A method as claimed in claim 1, wherein searching for an entity comprises requesting databases to obtain a list of entities matching a search criterion.

6. A method as claimed in claim 1, wherein searching for an entity matching a search criterion comprises searching for an entity matching a criteria related to a hotel.

7. A method as claimed in claim 6, wherein searching for an entity matching a search criterion comprises searching for a room matching a criteria related to a hotel.

8. A method as claimed in claim 4, wherein displaying the list of the or each descriptive entities comprises displaying the list of the or each price of the or each entity.

9. A method as claimed in claim 1, wherein automatically searching for one or more available parameters comprises searching based on instruction of a server.

10. A method as claimed in claim 1 wherein automatically searching for one or more available parameters comprises searching based on instruction of a user.

11. A system comprising:
    a processor and a memory, said processor and said memory coupled to a search module for searching for an entity matching a search criterion to obtain a list of entities, wherein the or each entity comprises a parameter having a predetermined availability and automatically searching for one or more available parameters associated with the or each entity;
    a memory module for incrementally generating a list of each first entity and one or more available parameters associated therewith to generate a list of entity and available parameters at substantially the same time;
    a filter for filtering the list of entity and available parameters in order to remove one or more combination of entity and parameter thereby generating modified list, wherein the filter comprises a dynamic filter which applies on dynamic data and a static filter which applies on static data;
    a display for displaying the list or the modified list as it said list is generated by the memory module or filter for selection by a user of a predetermined combination of entity and parameter;
    a filter display for displaying the one or more available parameters to provide a display of the filtered one or more combinations of entity and parameter.

12. A computer readable storage medium storing computer instructions which, when read by a computer cause the computer to search for availability of an entity for purchase or reservation by a method comprising:
    searching for an entity matching a search criterion to obtain a list of entities, wherein the or each entity comprises a parameter having a predetermined availability;
    automatically searching for one or more available parameters associated with the or each entity at substantially the same time;
    incrementally generating a list of each first entity and one or more available parameters associated therewith to generate a list of entity and available parameters as the automatic search provides one or more results;
    displaying the list as said list is generated for selection by a user of a predetermined combination of entity and parameter;
    filtering the list of entity and available parameters in order to remove one or more combination of entity and parameter, wherein filtering the list of entity and available parameters comprises filtering with a dynamic filter which applies on dynamic data and a static filter which applies on static data;
    displaying a modified list of entity and available parameter;
    displaying the one or more available parameters in a filter display to provide a display of the filtered one or more combinations of entity and parameter.

* * * * *